United States Patent
Inaguchi (10) Patent No.: US 11,321,656 B2
(45) Date of Patent: May 3, 2022

(54) DIFFERENCE EXTRACTING DEVICE (71) Applicant: FANUC CORPORATION, Yamanashi (JP)

(72) Inventor: Yuuzou Inaguchi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 16/935,194

(22) Filed: Jul. 22, 2020

(65) Prior Publication Data
US 2021/0027232 A1 Jan. 28, 2021

(30) Foreign Application Priority Data
Jul. 23, 2019 (JP) .............................. JP2019-135566

(51) Int. Cl.
*G06Q 10/06* (2012.01)

(52) U.S. Cl.
CPC .............................. *G06Q 10/06393* (2013.01)

(58) Field of Classification Search
None
See application file for complete search history.

(56) References Cited

U.S. PATENT DOCUMENTS

| 6,366,824 | B1* | 4/2002 | Nair | H01L 21/76224 |
| | | | | 257/E21.546 |
| 2003/0065975 | A1* | 4/2003 | Tuttle | G06F 11/261 |
| | | | | 714/33 |
| 2005/0091102 | A1* | 4/2005 | Retsina | G06Q 10/06393 |
| | | | | 705/7.39 |
| 2005/0119840 | A1* | 6/2005 | Astley | G01M 13/045 |
| | | | | 702/56 |
| 2005/0144205 | A1* | 6/2005 | Okita | G01R 13/02 |
| | | | | 708/200 |
| 2006/0013486 | A1* | 1/2006 | Burns | G06T 7/001 |
| | | | | 382/195 |
| 2006/0020425 | A1* | 1/2006 | Chang | G06Q 10/06 |
| | | | | 702/188 |
| 2006/0143671 | A1* | 6/2006 | Ens | D21G 9/0009 |
| | | | | 725/105 |
| 2008/0052040 | A1* | 2/2008 | Renner | G05B 21/02 |
| | | | | 702/182 |
| 2009/0248173 | A1* | 10/2009 | Sasko | G05B 19/41875 |
| | | | | 700/9 |
| 2009/0319245 | A1* | 12/2009 | Ivchenko | G01D 5/2291 |
| | | | | 703/13 |
| 2010/0079488 | A1* | 4/2010 | McGreevy | G09G 5/00 |
| | | | | 345/629 |

(Continued)

FOREIGN PATENT DOCUMENTS

JP H227204 U 2/1990

*Primary Examiner* — Sujay Koneru
(74) *Attorney, Agent, or Firm* — Hauptman Ham, LLP (57) ABSTRACT

A difference extracting device includes an information collecting unit configured to collect, from each of a plurality of production facilities each including a device having an electric motor and a control device configured to control the device, status information representing a state of each of the plurality of production facilities, a difference extracting unit configured to extract a difference in the status information between the plurality of production facilities, and a difference display processing unit configured to display the extracted difference on a display screen.

13 Claims, 6 Drawing Sheets

(56) References Cited

U.S. PATENT DOCUMENTS

| | | | |
|---|---|---|---|
| 2012/0036140 A1* | 2/2012 | Nielsen | G06Q 10/06 707/754 |
| 2014/0222209 A1* | 8/2014 | Radjy | G06Q 90/00 700/265 |
| 2014/0333775 A1* | 11/2014 | Naikal | G06K 9/00711 348/159 |
| 2015/0160273 A1* | 6/2015 | Thieme | G06Q 10/06 702/60 |
| 2015/0168268 A1* | 6/2015 | Fish | G01H 1/003 374/142 |
| 2015/0323926 A1* | 11/2015 | Wang | G05B 11/01 700/19 |
| 2016/0019563 A1* | 1/2016 | Jha | G06Q 30/0202 705/7.31 |
| 2016/0195872 A1* | 7/2016 | Arita | G05B 23/0229 700/44 |
| 2016/0299488 A1* | 10/2016 | Ogawa | G05B 19/4065 |
| 2016/0350879 A1* | 12/2016 | Radjy | G06Q 30/018 |
| 2017/0053289 A1* | 2/2017 | Wang | G05B 23/0278 |
| 2018/0203439 A1* | 7/2018 | Hattori | G05B 23/0221 |
| 2018/0227538 A1* | 8/2018 | Wang | H04N 5/76 |
| 2018/0264613 A1* | 9/2018 | Tamai | G05B 19/00 |
| 2018/0264868 A1* | 9/2018 | Okada | G07D 7/202 |
| 2018/0356804 A1* | 12/2018 | Oka | G05B 19/418 |
| 2018/0357334 A1* | 12/2018 | Chao | G05B 19/406 |
| 2019/0017719 A1* | 1/2019 | Sinha | G05B 15/02 |
| 2019/0080274 A1* | 3/2019 | Kovach | G06Q 10/06398 |
| 2019/0101876 A1* | 4/2019 | Ghangam | G05B 13/021 |
| 2019/0331409 A1* | 10/2019 | Jung | F25D 29/006 |
| 2020/0013156 A1* | 1/2020 | Weiss | G06T 7/001 |
| 2020/0014854 A1* | 1/2020 | Katsunuma | H04N 5/247 |
| 2020/0233392 A1* | 7/2020 | Jonas | G05B 19/048 |
| 2020/0300619 A1* | 9/2020 | Cosneau | B07C 5/122 |
| 2020/0311909 A1* | 10/2020 | Lei | G01B 11/24 |
| 2020/0312036 A1* | 10/2020 | Nguyen | G06Q 50/02 |
| 2020/0379016 A1* | 12/2020 | Paul | G01R 13/345 |
| 2020/0387818 A1* | 12/2020 | Chan | G06F 17/18 |
| 2020/0393824 A1* | 12/2020 | Ono | G05B 23/024 |
| 2021/0056681 A1* | 2/2021 | Hyatt | G05B 19/41875 |
| 2021/0310960 A1* | 10/2021 | Li | B25J 11/00 |

* cited by examiner

DIFFERENCE EXTRACTING DEVICE

RELATED APPLICATIONS

The present application claims priority to Japanese Application Number 2019-135566, filed Jul. 23, 2019, the disclosure of which is hereby incorporated by reference herein in its entirety.

BACKGROUND OF THE INVENTION

1. Field of the Invention

The present invention relates to a difference extracting device configured to extract and display differences between two or more production facilities.

2. Description of the Related Art

When increasing production facilities that employ devices such as processing machines, an existing production facility may be replicated to build a new production facility identical to the existing production facility. However, it is often difficult to build a complete replica of an existing production facility, i.e., to completely match two production facilities in regard to models of the processing machines, peripheral devices, components, and the like. Thus, when setting up a new production facility, a worker familiar with a production facility performs various checks on the basis of specifications or compares a new production facility with an existing production facility in order to prevent occurrence of malfunction due to the fact that complete replication of the existing production facility cannot be built.

JP H02-27204 UM-A describes an integrated monitoring device configured to monitor the states of a plurality of moving devices included in a machine tool, and discloses "an integrated monitoring device, including an output terminal, a selector switch configured to output one switch signal to the output terminal each time the selector switch is operated by an operator, a plurality of selector input terminals configured to each receive a selection signal corresponding to one of a plurality of target devices selected by an external control device in response to the output switch signal, a selected target device display device configured to display the currently selected target device on the basis of the selection signal input to the selector input terminals, at least one information input terminal configured to receive input of relevant information related to each of the plurality of target devices from the external control device, and a relevant information display device configured to display information related to the relevant information input to the at least one information input terminal" (line 11, page 6 to line 4, page 7).

SUMMARY OF THE INVENTION

There is a need for a device that enables a worker to perform adjustment work more efficiently so as to prevent occurrence of malfunction when a new production facility is set up by replicating an existing production facility as described above.

One aspect of the present disclosure is a difference extracting device including an information collecting unit configured to collect, from each of a plurality of production facilities each including a device having an electric motor and a control device configured to control the device, status information representing a state of each of the plurality of production facilities, a difference extracting unit configured to extract a difference in the status information between the plurality of production facilities, and a difference display processing unit configured to display the extracted difference on a display screen.

BRIEF DESCRIPTION OF THE DRAWINGS

The objects, features and advantages of the present invention will become more apparent from the description of the following embodiments in connection with the accompanying drawings, wherein: in the accompanying drawings.

DETAILED DESCRIPTION

Embodiments of the present disclosure will be described below with reference to the accompanying drawings. Throughout the drawings, corresponding components are denoted by common reference numerals. For ease of understanding, these drawings are scaled as appropriate. The embodiments illustrated in the drawings are examples for implementing the present invention, and the present invention is not limited to the embodiments illustrated in the drawings.

Figure 1:
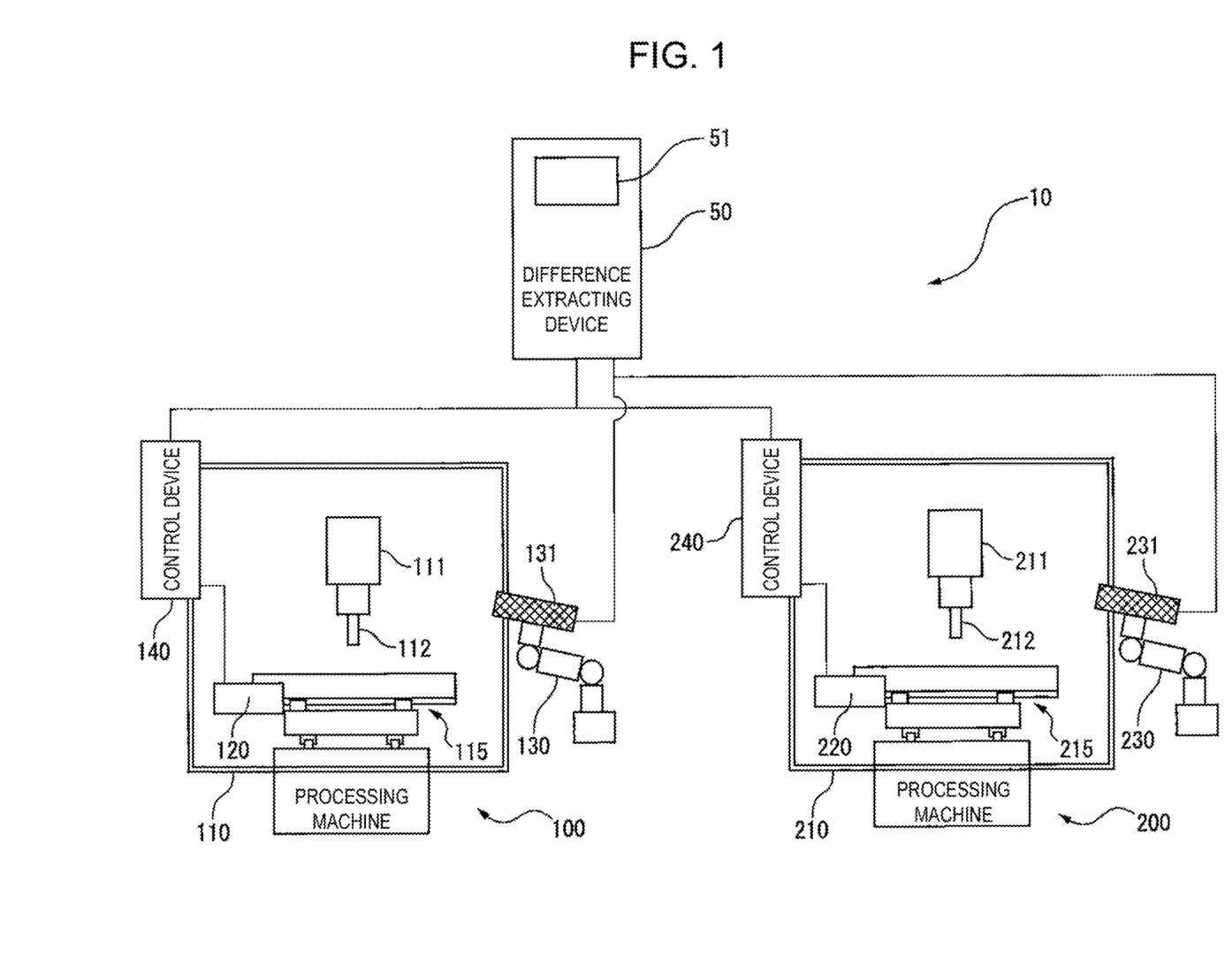
FIG. 1 is a diagram illustrating the overall configuration of a production system including a difference extracting device according to an embodiment.

FIG. 1 is a diagram illustrating an overall configuration of a production system 10 including a difference extracting device 50 according to an embodiment. As illustrated in FIG. 1, the production system 10 includes two production facilities 100 and 200, and the difference extracting device 50 is connected to these two production facilities 100 and 200. In this embodiment, as an example, the production facility 100 is an existing facility, and the production facility 200 is a newly installed facility produced by replicating the production facility 100. The difference extracting device 50 according to this embodiment displays, on a display screen, differences between two pieces of status information that represent states of the production facilities 100 and 200. Thus, the difference extracting device 50 enables a worker to recognize differences between the two production facilities, and to perform adjustment work necessary for starting up the production facility 200 more efficiently. In the following description, the production facilities 100, 200 are each described as a processing system including a processing machine having an electric motor and a control device that controls the processing machine, but the present invention is not limited to this example. The production facility may be one of a variety of systems including a device having an electric motor (an assembly device, an inspection device, a transport device, etc.) and a control device that controls the device.

The production facility 100 includes a processing machine 110, a control device 140 that controls the processing machine 110, and a robot 130 that handles a workpiece. As an example, the processing machine 110 includes a spindle drive mechanism 111 that drives a spindle axis 112, and a table moving mechanism 115 that moves a table on which the workpiece is placed. The processing machine 110 includes a plurality of motors such as a spindle motor included in the spindle drive mechanism 111 that drives the spindle axis 112 and a motor 120 that drives the table moving mechanism 115. In FIG. 1, the motor 120 is illustrated as a representative motor. Another type of processing machine having a configuration other than that illustrated may be used as the processing machine 110.

The control device 140 is, for example, a computer numerical control device (CNC) and controls operation of the processing machine 110 according to operation commands described in a processing program (an operation program). The control device 140 may be configured as a general computer that includes a CPU, a ROM, a RAM, a storage device, an operation unit, a display unit, a communication interface, and an input/output interface for an external device, etc. In the production facility 100, a camera 131 is mounted on a moving part of the robot 130. Various images for monitoring the state of the production facility 100 can be acquired through moving the camera 131 with the robot 130. The camera 131 is connected to the difference extracting device 50 so that the difference extracting device 50 is provided with the images captured by the camera 131.

The production facility 200 has the same configuration as that of the production facility 100 (i.e., a configuration that runs the same processing program as that of the production facility 100), and includes a processing machine 210, a control device 240 that controls the processing machine 210, and a robot 230 that handles a workpiece. The processing machine 210 includes a spindle drive mechanism 211 that drives a spindle axis 212, a table moving mechanism 215 that moves a table on which the workpiece is placed, and a plurality of motors such as a spindle motor (not illustrated) included in the spindle drive mechanism 211 that drives the spindle axis 212, and a motor 220 that drives the table moving mechanism 215. In the following description, when describing the functions of the production facility 100, it is assumed that the production facility 200 has the same functions. The difference extracting device 50 is connected to the control devices 140 and 240 via a network such as a Local Area Network (LAN), for example. The difference extracting device 50 may be disposed at a location different from the plant in which the production facilities 100 and 200 are located. The production facilities 100 and 200 may be located in the same plant or may be located at different plants.

The control device 140 performs servo control of each of the motors in the processing machine 110. While performing servo control of the motors in the processing machine 110, the control device 140 can acquire various information related to the operating state of each motor (current and torque, speed, position, temperature, etc.), and can provide the information (hereinafter also referred to as "first information") related to the operating state of each motor to the difference extracting device 50. The production facility 100 is further provided with a physical quantity detector that detects various physical quantities related to the state of the production facility 100. The physical quantities related to the state of the production facility to be detected by the physical quantity detector include various information that can represent the state of the production facility, such as information on objects acquired from images (position, shape, size, etc.), vibration, current (power source current, etc.), temperature, humidity, force, and the presence or position of various objects such as a workpiece. The physical quantity detector is a detector that can acquire the information described above, and may include various sensors, such as an imaging device, a current meter, a vibration detection sensor (an acceleration sensor), a temperature sensor, a humidity sensor, a force sensor, a proximity sensor, and a distance sensor. In the following description, information obtained by the physical quantity detector (i.e., information different from the first information) may also be referred to as "second information". The second information detected by the physical quantity detector in relation to the state of the production facility may include, as physical quantities related to the installation location of each production facility, an image, temperature, humidity, and floor vibration of the installation location. In the configuration example of FIG. 1, the camera 131 that detects the state of the production facility as an image is disposed as the physical quantity detector. The first information and the second information may include, in addition to information indicating instantaneous values, time series data, such as, waveform data and response timing of the sensors (e.g., response timing of a proximity sensor associated with movement of a workpiece).

In the present embodiment, the difference extracting device 50 extracts and displays differences between the two production facilities 100 and 200 with respect to the first information related to the operating states of the motors and the second information detected by the physical quantity detector. According to the above described configuration in which, in addition to the differences in regard to the information related to the operating states of the motors, the differences in regard to the information detected by the physical quantity detector are displayed, it is possible to provide beneficial information to a worker who starts up the production facility 200 to cause the production facility 200 to execute an initial operation.

Figure 2:
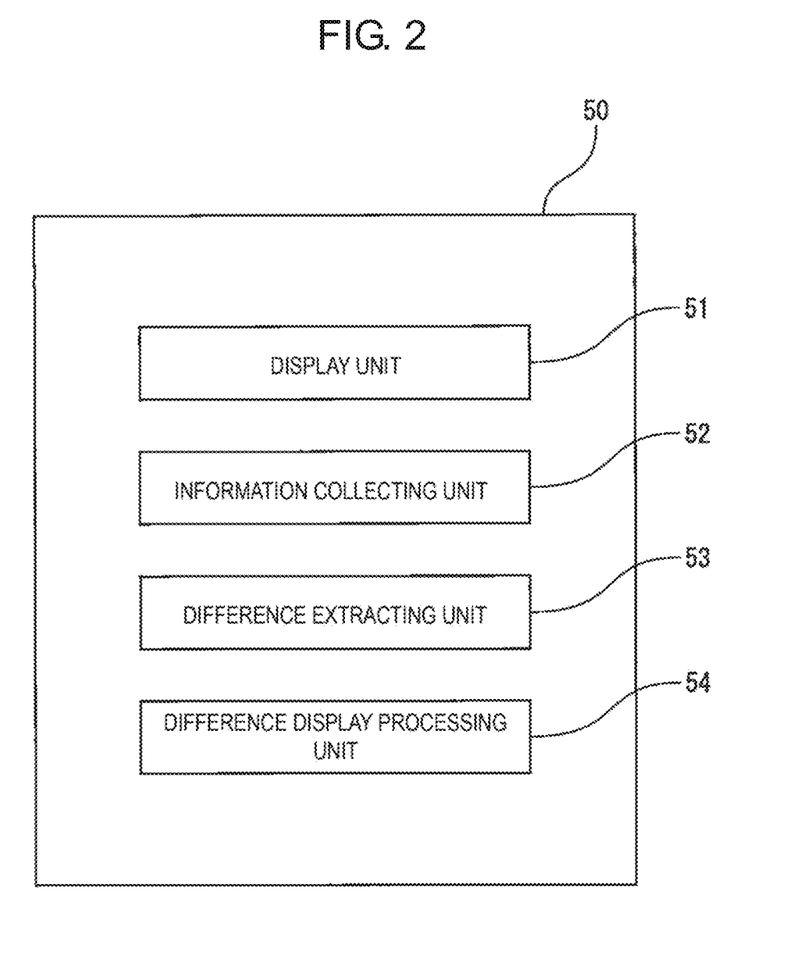
FIG. 2 is a functional block diagram of the difference extracting device.

FIG. 2 is a functional block diagram of the difference extracting device 50. As illustrated in FIG. 2, the difference extracting device 50 includes a display unit 51, an information collecting unit 52, a difference extracting unit 53, and a difference display processing unit 54. The difference extracting device 50 may be configured as a general computer that includes a CPU, a ROM, a RAM, a storage device, an operation unit, a display unit, a communication interface, and an input/output interface for an external device, etc. The various functions of the difference extracting device 50 may be implemented as software to be executed by the CPU of the difference extracting device 50.

The display unit 51 is a display such as a liquid crystal display device. The information collecting unit 52 acquires information related to the operating states of the motors in the processing machine 110 from the control device 140 as information related to the state of the production facility 100, and also acquires images captured by the camera 131. The images captured by the camera 131 are images including, for example, the spindle axis 112, the table moving mechanism 115, and the workpiece under (or after) processing in the processing machine 110. The difference extracting unit 53 compares information related to the state of the production facility 100 with information related to the state of the production facility 200 collected by the information collecting unit 52, and extracts differences between these pieces of information. The difference display processing unit 54 performs processing of causing the display unit 51 to display the differences between the production facility 100 and the production facility 200 extracted by the difference extracting unit 53. The series of processes from the collection of the information by the information collecting unit 52 to the display of the differences by the difference display processing unit 54 may be initiated by, for example, a start instruction operation input by the worker to the operation unit of the difference extracting device 50.

Figure 3:
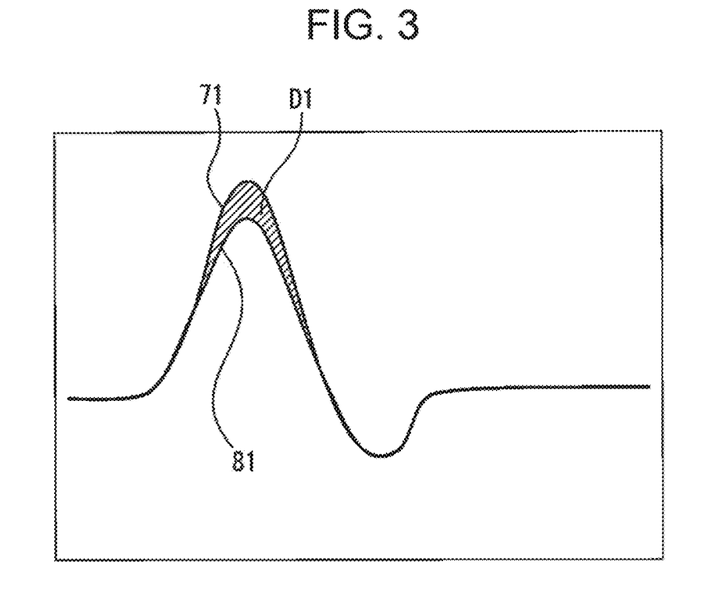
FIG. 3 is a first display example of differences between a plurality of production facilities in regard to information related to operating states of motors.
Figure 4:
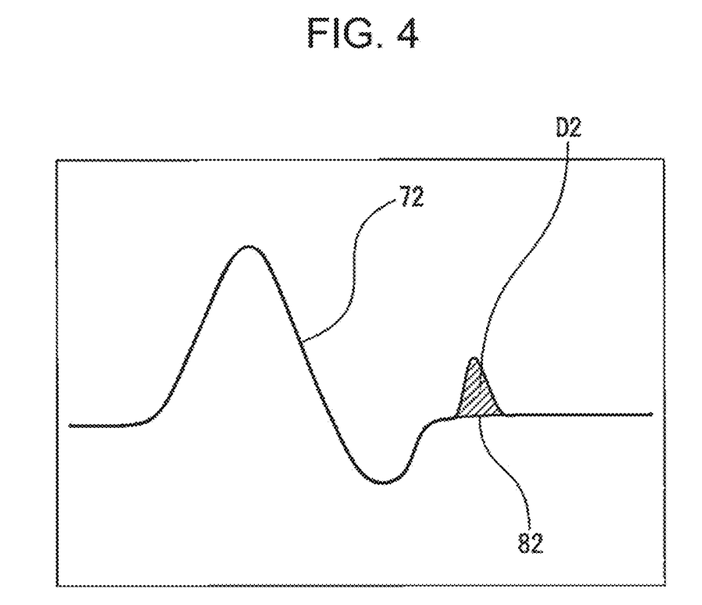
FIG. 4 is a second display example of differences between a plurality of production facilities in regard to information related to operating states of motors.
Figure 5:
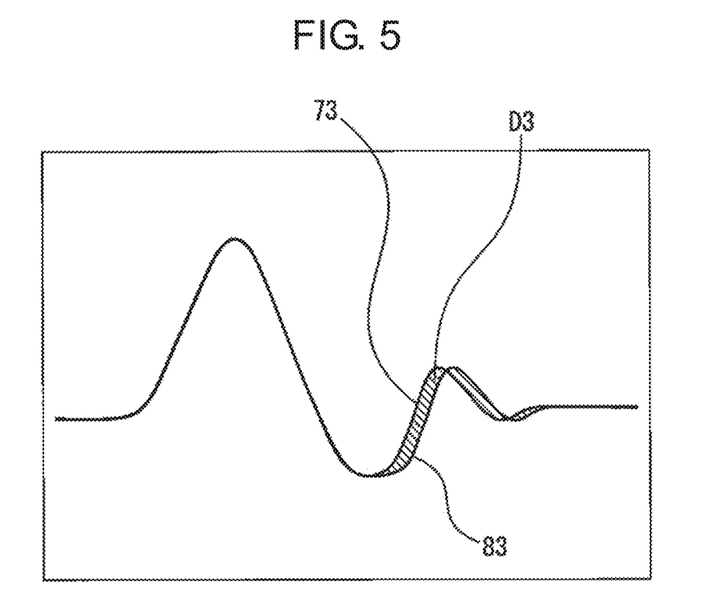
FIG. 5 is a third display example of differences between a plurality of production facilities in regard to information related to operating states of motors.

FIGS. 3 to 5 illustrate examples of information displayed, on the basis of the information related to the operating states of the motors acquired from the control devices 140 and 240, by the difference extracting device 50 as differences between the production facility 100 and the production facility 200. In the examples in FIGS. 3 to 5, waveform data, which is time series data of a signal representing the operating state of a motor (torque command, current value, position information), is used for comparison. In FIG. 3, a signal waveform 71 is a signal waveform related to operation of a motor in the processing machine 110, and a signal waveform 81 is a signal waveform related to operation of a motor in the processing machine 210. These signal waveforms 71 and 81 are displayed in an overlapping manner (the same applies to FIGS. 4 and 5 below). The signal waveform 71 and the signal waveform 81 have different maximum value heights (peaks). The difference extracting device 50 displays, in a highlighted manner, a different portion D1 (a shaded portion in FIG. 3) between the two signal waveforms 71 and 81 so as to enable the worker to visually recognize the different portion D1 instantly.

In FIG. 4, a signal waveform 72 is a signal waveform related to operation of a motor in the processing machine 110, and a signal waveform 82 is a signal waveform related to operation of a motor in the processing machine 210. Between the signal waveform 72 and the signal waveform 82, only the signal waveform 72 has a relatively small protruding waveform portion (a different portion D2), and the signal waveform 82 does not have such a protruding portion. The difference extracting device 50 displays, in a highlighted manner, the different portion D2 (shaded portion in FIG. 4) between the two signal waveforms 72 and 82 so as to enable the worker to visually recognize the different portion D2 instantly.

In FIG. 5, a signal waveform 73 is a signal waveform related to operation of a motor in the processing machine 110, and the signal waveform 83 is a signal waveform related to operation of a motor in the processing machine 210. The signal waveform 73 and the signal waveform 83 have portions (a different portion D3) which temporally shift with respect to each other. The difference extracting device 50 displays, in a highlighted manner, the different portion D3 (shaded portion in FIG. 5) at which the temporal shift occurs between the two signal waveforms 73 and 83 so as to enable the worker to visually recognize the different portion D3 instantly.

The difference between the signal waveforms representing the operation of motors as illustrated in FIGS. 3 to 5 may arise due to a variety of factors, such as difference in mounted tools, difference in components, omission of components, and difference in workpiece placement. By displaying differences between the signal waveforms as illustrated in FIGS. 3 to 5 along with information on, for example, a motor (axis) as a component which causes the difference, it becomes possible for the worker to use the displayed information as a clue to quickly recognize target components that need to be adjusted.

Figure 6:
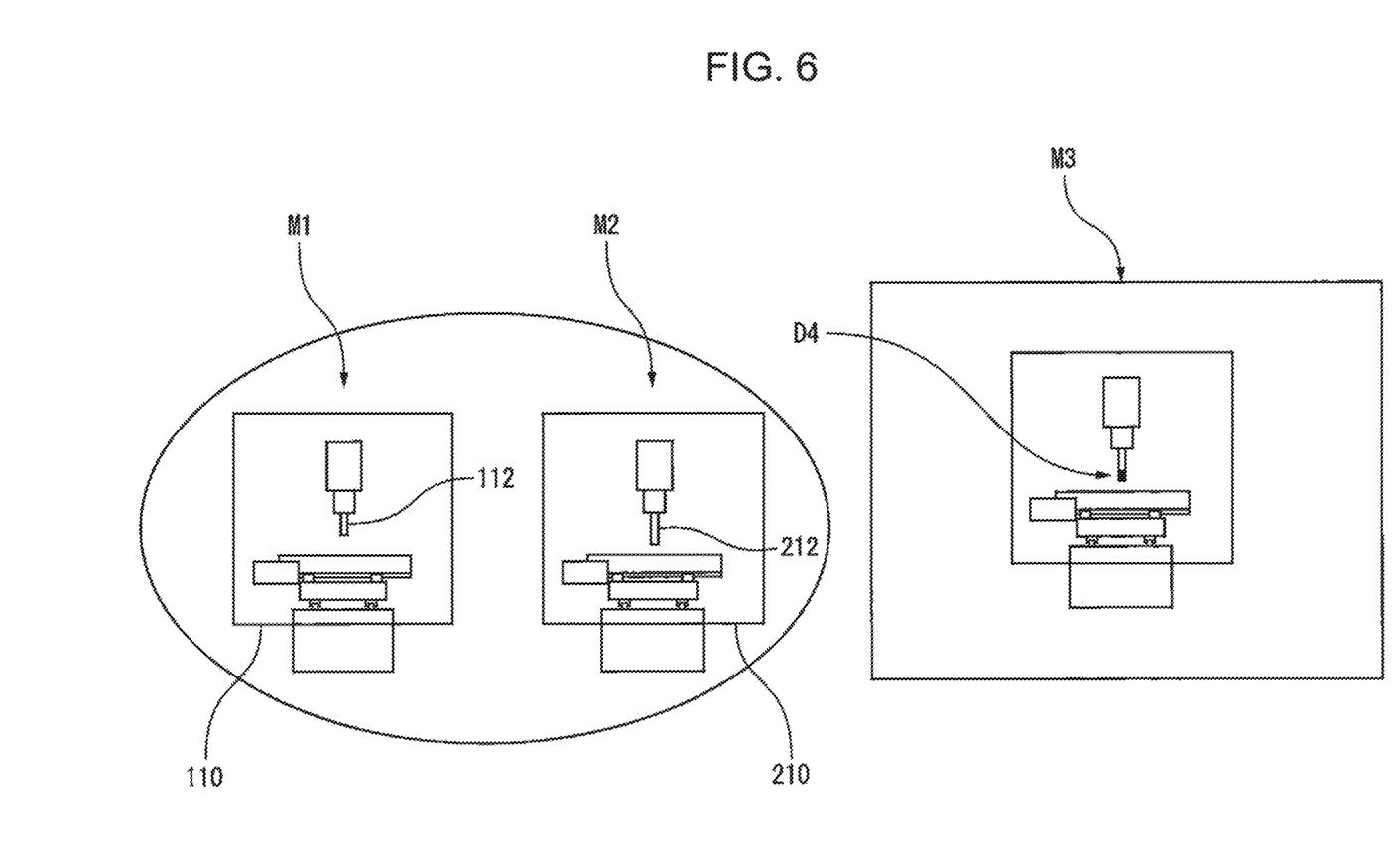
FIG. 6 is a display example of differences between two production facilities based on images.

FIG. 6 is a diagram illustrating an example in which the difference extracting device 50 displays differences between two production facilities on the basis of images. In FIG. 6, an image M1 represents an image that is captured by the camera 131 in the production facility 100 and includes the spindle axis 112 and the table moving mechanism 115 of the processing machine 110. An image M2 represents an image that is captured by the camera 231 in the production facility 200 and includes the spindle axis 212 and the table moving mechanism 215 of the processing machine 210. The image M1 and image M2 are images which are captured at the same time when the two production facilities 100 and 200 are synchronously operated. The robot 130 and the robot 230 operate such that the cameras 131 and 231 capture, as the images M1 and M2, images of the equivalent locations in the respective production facilities at the same angle. In FIG. 6, an image M3 represents the difference between the image M1 and the image M2 and is displayed on the display unit 51 by the difference extracting device 50. In the example of FIG. 6, there is a difference in regard to the position of the leading end of the spindle axis (or a tool) between the image M1 and the image M2. Thus, a different portion D4 at the leading end of the spindle axis (or a tool) is highlighted in the image M3. The different portion D4 between the two images M1 and M2 may be obtained by, for example, calculating the difference between image data of the two images M1 and M2.

The difference extracting device 50 simultaneously displays, on the display unit 51, the information related to the differences between signal waveforms of the motors as illustrated in FIGS. 3 to 5 and the information related to the differences between images as illustrated in FIG. 6. This allows the worker to more quickly and accurately identify target components that need to be adjusted. For example, when there is a difference in the current (or torque) waveform of the motor that drives the spindle axis and an image indicative of a difference such as that illustrated in FIG. 6 is displayed, the worker can instantly identify that the tool mounted on the spindle axis is not the proper tool.

In some cases, the same processing program may be executed in the two production facilities 100 and 200 at different timings. In such a case, the information collecting unit 52 may collect status information from the two production facilities 100 and 200 at different timings. In this case, the difference extracting unit 53 extracts differences between the production facilities 100 and 200 after matching, on a time axis, timings of the status information collected for the production facilities 100 and 200. This makes it possible to perform accurate comparison.

When the difference extracting device 50 extracts differences between the two production facilities 100 and 200, the control devices 140 and 240 of the two production facilities 100 and 200 may synchronously execute the processing program. In this case, the times of the two control devices 140 and 240 are mutually adjusted in advance, and the two control devices 140 and 240 simultaneously start the processing program. Alternatively, one control device is operated in accordance with an operation signal from the other control device. With such a configuration, the difference extracting device 50 can collect status information and display the differences in real time.

The difference extracting device 50 may extract differences between the production facilities 100 and 200 by comparing past status information acquired and recorded by operating the production facility 100 with status information collected by operating the production facility 200. The difference extracting device 50 may operate the production facility 200 multiple times to acquire a plurality of pieces of status information and use an average value of the plurality of pieces of status information for comparison in order to obtain more stable information to be used as the status information of the production facility 200.

The information related to the state of the production facility 200 may be collected by controlling the processing machine 210 of the production facility 200 from the control device 140 of the production facility 100. In this case, it can be assumed that the control device 140 properly operates because the production facility 100 is the existing facility. In this case, when a difference is found between the information representing the state of the production facility 200 and the information representing the state of the production facility 100, it can be assumed that there is some malfunction in a mechanical system rather than a control system in the production facility 200. In other words, when identifying malfunction in a new facility, whether the malfunction is caused in a control system or in a mechanical system can be clearly determined in advance.

In this case, specifically, the control device 140 generates operation commands on the basis of the processing program and transmits the operation commands to the control device 240 via the network to control the processing machine 210 via the control device 240. The control device 240 returns feedback data from the processing machine 210 to the control device 140 to mediate control of the processing machine 210 by the control device 140.

Figure 7:
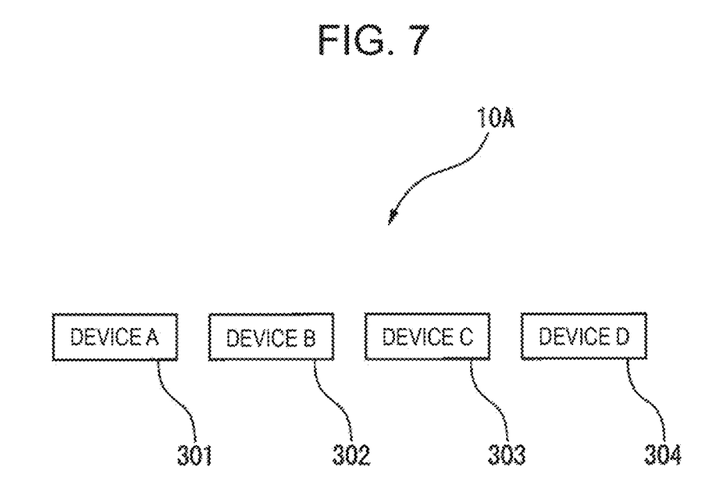
FIG. 7 is a diagram illustrating an extraction example of differences when there are four sets of production facilities.

Next, an example of extracting differences when there are three or more sets of production facilities will be described with reference to FIGS. 7 and 8. FIG. 7 schematically illustrates a configuration example of a production system 10A including four sets of production facilities 301 to 304. In FIG. 7, the four sets of production facilities 301 to 304 are described as a device A, a device B, a device C, and a device D, respectively, for convenience of explanation. In this example, each device includes a processing machine and a control device, for example. Assume that, in the configuration example of FIG. 7, each of the devices A to D is a facility newly created through replication, and a difference extracting device is connected to each of the devices A to D via a network. In this configuration, the difference extracting device acquires information related to the state of a production facility from each of the devices A to D. In this case, the difference extracting device may extract and display differences as follows.

Operation Example A1

As a first operation example, when, for example, information acquired from three devices (e.g., devices A to C) of the four devices A to D is the same and information acquired from one device (e.g., device D) is different from the information acquired from the three devices, the difference extracting device causes the device (device D) from which the different information is acquired to display a warning message indicating that the device is abnormal together with the differences. This operation is based on the fact that, when the majority of a plurality of replicated facilities output the same information, those facilities can be regarded as operating normally. As a more specific operation example, the difference extracting device collects, from each of the four devices A to D, status information (time series information) in a case where the four devices A to D execute the same operation program, and compares the status information after matching, on a time axis, operation timing of the status information collected from the four devices A-D. Then, when the status information from three devices (e.g., devices A to C) of the four devices A to D is the same and the status information from one device (e.g., device D) is different from the status information of the three devices, the difference extracting device causes the device D to display a warning message and information related to the difference. As the information related to the difference, for example, information related to a component that is a factor causing the difference and/or information related to the timing at which the difference has occurred (e.g., a time of day, an elapsed time from the start of an operation program, a location, in an operation program, where the difference has occurred) may be displayed together with the information described above with reference to FIGS. 3 to 6.

Operation Example A2

As a second operation example, when, for example, information from the device A and information from the device B match with each other and information from the device C and information from the device D match with each other, but the information from the device A and the device B and the information from the device C and the device D differ from each other, the difference extracting device may cause all the devices A to D to display a warning message together with the differences.

Figure 8:
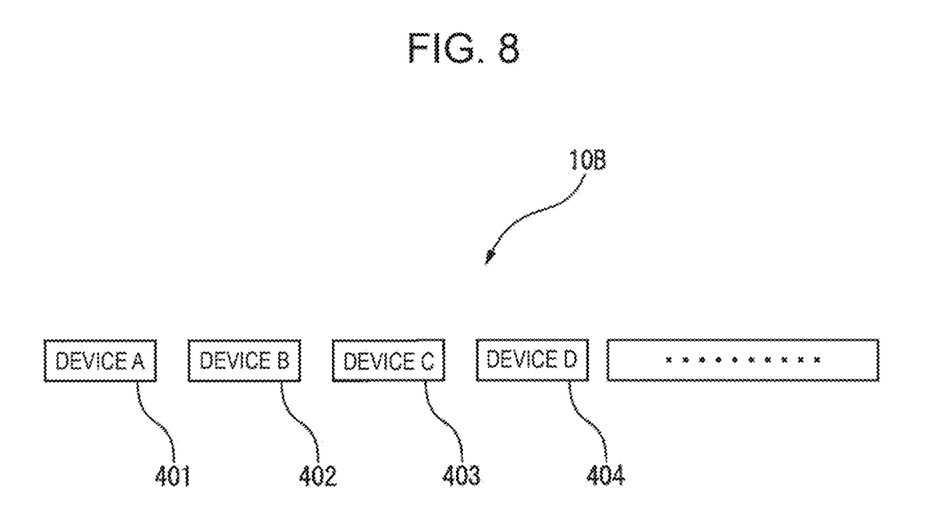
FIG. 8 is a diagram illustrating an extraction example of differences when there are four or more sets of production facilities.

FIG. 8 schematically illustrates a configuration example of a production system 10B including more than four sets of production facilities. In FIG. 8, four sets of production facilities, which are some of a plurality of production facilities, are denoted by reference numbers 401 to 404, and designated as a device A, a device B, a device C, and a device D, respectively, for convenience of explanation. Each device includes a processing machine and a control device, for example. Assume that, in the configuration example of FIG. 8, each device is a facility newly created through replication, and a difference extracting device is connected to the plurality of production facilities via a network. In this configuration, the difference extracting device acquires information related to the state of a production facility from each device. In this case, the difference extracting device may extract and display differences as follows.

Operation Example B1

As a first operation example, when pieces of information collected from some of all the production facilities included in the production system 10B match with each other and there is no other pieces of information that match with each other between the production facilities, a group of production facilities having the matched information is considered to be operating normally. Then, the difference extracting device causes the production facilities that do not have the matched information to display a warning message and the differences.

Operation Example B2

A second operation example is a method for determining which device is to display a warning message on the basis of an index representing variation in the information between all the production facilities included in the production system 10B. For example, on the basis of a standard deviation of values representing status information acquired from all the production facilities, a production facility with a value representing status information exceeding the standard deviation is considered to be abnormal. Alternatively, when a deviation of a value representing the status information of a device from an average of values representing the status information of all the devices is greater than a deviation from the average within which values representing the status information of devices of 80% of all the devices are included, such a device may be considered to be abnormal. In this case, the difference extracting device causes the device determined to be abnormal to display the difference and a warning message.

The above-described configuration makes it possible to display beneficial information that allows a worker to identify target components that need to be adjusted, and prevent the occurrence of malfunction when replicating a production facility.

While the disclosure has been described with reference to specific embodiments, it will be understood, by those skilled in the art, that various changes or modifications may be made thereto without departing from the scope of the following claims.

In the embodiments described above, the physical quantity detector is described as cameras respectively disposed in the two production facilities, but the physical quantity detector may be provided as a single moving device. In this case, one physical quantity detector may be moved between a plurality of production facilities to acquire information (e.g., images) related to the production facilities.

The series of processes from the collection of information by the information collecting unit 52 to the display of differences by the difference display processing unit 54 may be executed periodically, for example, in accordance with schedule information preset in the difference extracting device 50. In this case, malfunctions can be found during continuous actual operation of the production facility in addition to at the startup of the production facility.

In the above-described embodiments, the difference extracting device is described as a separate device connected to each of the production facilities via a network, but the present invention is not limited to such a configuration. For example, the difference extracting device may be configured as a device that belongs to one of the production facilities. Alternatively, the difference extracting device may be provided as a part of the functions of the control device of one of the production facilities. In these cases, a difference extracting device or a control device having the function as a difference extracting device in one production facility can cause each production facility to display extraction results of the differences by transmitting the extraction results of the differences to a control device in another production facility.

The invention claimed is:

1. A difference extracting device, comprising:
    a processor configured to:
        collect, from a first production facility including a first device having a first electric motor and a first control device configured to control the first device, first status information representing a state of the first production facility;
        collect, from a second production facility which is a replica of the first production facility and includes a second device having a second electric motor and a second control device configured to control the second device, second status information representing a state of the second production facility, and
        extract a difference between the first and the second status information of the first and the second production facilities; and
    a display configured to display the extracted difference,
    wherein
        the first status information and the second status information are obtained at a same time when the first production facility and the second production facility are synchronously operated with each other under a same operation program executed by each of the first and the second control devices.

2. The difference extracting device according to claim 1, wherein
    the display is configured to display, together with the difference, information related to at least one of (a) a component of the first device or the second device that is a factor causing the difference or (b) timing at which the difference occurs.

3. The difference extracting device according to claim 1, wherein
    the first status information includes first information representing an operating state of the first electric motor in the first production facility detected by a first physical quantity detector and the second status information includes second information representing a state of the second production facility detected by a second physical quantity detector, the second information being different from the first information,
    the processor is further configured to extract a first difference in the first information between the first and the second production facilities and extract a second difference in the second information between the first and the second production facilities, and
    the display is configured to display the extracted first difference and the extracted second difference on a display screen.

4. The difference extracting device according to claim 3, wherein
    the first information is waveform data of a signal representing the operating state of the electric motor, and
    the display is configured to display, on the display screen, the waveform data of the first and the second facilities in an overlapping manner, and highlights as the first difference, a difference between the waveform data of the first and the second production facilities.

5. The difference extracting device according to claim 1, wherein
    the processor is disposed to belong to one of the first and the second production facilities.

6. The difference extracting device according to claim 1, wherein
    the processor is connected to each of the first and the second control devices of the first and the second production facilities via a network.

7. The difference extracting device according to claim 1, wherein
    the first and the second status information is time series information representing the state of each of the first and the second production facilities during a period in which each of the first and the second control devices in the first and the second production facilities executes the same operation program.

8. The difference extracting device according to claim 1, wherein
    the processor is configured to collect the first status information related to the second production facility during a period in which the first control device of the first production facility controls the second device of the second production facility.

9. The difference extracting device according to claim 1, wherein
the processor is configured to extract the difference by using the first and the second status information recorded in the past for at least one production facility within the first and the second production facilities.

10. The difference extracting device according to claim 3, wherein
the physical quantity detector detects, as a physical quantity related to an installation location of each of the first and the second production facilities, a physical quantity including at least one of an image, temperature, humidity, or floor vibration of the installation location.

11. The difference extracting device according to claim 1, wherein
the processor is configured to collect the first and the second status information, extract the difference, and the display displays the difference according to preset schedule information.

12. The difference extracting device according to claim 1, wherein
the display is configured to display the difference highlighted by shading a portion between a first waveform data of the first status information from the first facility and a second waveform data of the second status information from the second facility.

13. The difference extracting device according to claim 1, wherein the first status information represents a first location in the first production facility at a first angle, and the second status information represents a second location in the second production facility at a second angle which is the same as the first angle, the second location being equivalent to the first location.

* * * * *